United States Patent
Emerson et al.

(10) Patent No.: US 11,472,566 B2
(45) Date of Patent: Oct. 18, 2022

(54) CATALYST DECAY MONITORING OF CATALYTIC INERTING SYSTEM

(71) Applicant: Hamilton Sundstrand Corporation, Charlotte, NC (US)

(72) Inventors: Sean C. Emerson, Broad Brook, CT (US); Zissis A. Dardas, Worcester, MA (US); Randolph Carlton McGee, Hamden, CT (US); Eric Surawski, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 164 days.

(21) Appl. No.: 17/086,667

(22) Filed: Nov. 2, 2020

(65) Prior Publication Data
US 2021/0047048 A1    Feb. 18, 2021

Related U.S. Application Data

(62) Division of application No. 15/945,292, filed on Apr. 4, 2018, now Pat. No. 10,858,119.

(51) Int. Cl.
*B64D 37/32* (2006.01)
*A62C 3/06* (2006.01)
(Continued)

(52) U.S. Cl.
CPC .............. *B64D 37/32* (2013.01); *A62C 3/065* (2013.01); *A62C 3/08* (2013.01); *B01D 53/265* (2013.01); *B01J 7/00* (2013.01); *B01J 8/02* (2013.01); *B01J 19/14* (2013.01); *B01J 19/2445* (2013.01); *B01J 2208/00725* (2013.01); *B01J 2208/00955* (2013.01); *B01J 2219/24* (2013.01)

(58) Field of Classification Search
None
See application file for complete search history.

(56) References Cited

U.S. PATENT DOCUMENTS 3,232,885 A    2/1966   Henke
3,847,298 A   11/1974   Hamilton
(Continued)

FOREIGN PATENT DOCUMENTS

EP    3069775 A1    9/2016
EP    3279092 A1    2/2018

OTHER PUBLICATIONS

EPO Official Letter for Application No. 19166818.5, dated Feb. 10, 2021, 3 pages.
(Continued)

*Primary Examiner* — Jennifer A Leung
(74) *Attorney, Agent, or Firm* — Cantor Colburn LLP (57) ABSTRACT

A fuel tank inerting system includes a primary catalytic reactor comprising an inlet, an outlet, a reactive flow path between the inlet and the outlet, and a catalyst on the reactive flow path. The catalytic reactor is arranged to receive fuel from the fuel tank and air from an air source that are mixed to form a combined flow, and to react the combined flow along the reactive flow path to generate an inert gas. The system also includes an input sensor that measures a property of the combined flow before it enters the primary catalytic reactor and an output sensor that measures the property of the combined flow after it exits the primary catalytic reactor.

9 Claims, 4 Drawing Sheets

(51) Int. Cl.
 *A62C 3/08* (2006.01)
 *B01D 53/26* (2006.01)
 *B01J 19/24* (2006.01)
 *B01J 19/14* (2006.01)
 *B01J 8/02* (2006.01)
 *B01J 7/00* (2006.01)

(56) References Cited

U.S. PATENT DOCUMENTS

| | | |
|---|---|---|
| 5,684,248 A | 11/1997 | Iwata |
| 7,306,644 B2 | 12/2007 | Leigh et al. |
| 7,628,965 B2 | 12/2009 | Johnson et al. |
| 7,694,916 B2 | 4/2010 | Limaye et al. |
| 7,896,292 B2 | 3/2011 | Limaye et al. |
| 8,663,996 B2 | 3/2014 | Beeson |
| 9,144,768 B2 | 9/2015 | Tichborne et al. |
| 2003/0233936 A1 | 12/2003 | Crome |
| 2004/0163826 A1 | 8/2004 | Spring |
| 2005/0115404 A1 | 6/2005 | Leigh et al. |
| 2008/0099618 A1* | 5/2008 | Zaki ............... B01D 19/0073 244/135 R |
| 2009/0227034 A1* | 9/2009 | Limaye ............ B01D 53/30 422/111 |
| 2011/0262309 A1 | 10/2011 | Limaye et al. |
| 2011/0263035 A1 | 10/2011 | Beeson |
| 2012/0087807 A1* | 4/2012 | Buchwald ........... B64D 37/32 417/54 |
| 2017/0328312 A1 | 11/2017 | Walker et al. |
| 2018/0370650 A1 | 12/2018 | Frost et al. |
| 2019/0308740 A1 | 10/2019 | Emerson et al. |

OTHER PUBLICATIONS

European Search Report for Application No. 19166818.5, dated Aug. 21, 2019, 8 pages.

* cited by examiner

CATALYST DECAY MONITORING OF CATALYTIC INERTING SYSTEM

CROSS REFERENCE TO RELATED APPLICATIONS

This application is a division of U.S. patent application Ser. No. 15/945,292, filed Apr. 4, 2018, the disclosure of which is incorporated by reference herein in its entirety.

BACKGROUND

The subject matter disclosed herein generally relates to fuel handling systems, and more particularly to monitoring the catalyst in a fuel tank inerting systems such as used on aircraft.

It is recognized that fuel vapors within fuel tanks become combustible in the presence of oxygen. An inerting system decreases the probability of combustion of flammable materials stored in a fuel tank by maintaining a chemically non-reactive or inert gas, such as nitrogen-enriched air, in the fuel tank vapor space, also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen-enriched air (NEA) to the ullage, thereby displacing oxygen with a mixture of nitrogen and oxygen at target thresholds for avoiding explosion or combustion.

It is known in the art to equip aircraft with onboard inert gas generating systems, which supply nitrogen-enriched air to the vapor space (i.e., ullage) within the fuel tank. The nitrogen-enriched air has a substantially reduced oxygen content that reduces or eliminates combustible conditions within the fuel tank. Onboard inert gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and NEA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system and anti-ice systems. Moreover, certain flight conditions such as during aircraft descent can lead to an increased demand for NEA at precisely the time when engines could be throttled back for fuel savings so that maintaining sufficient compressed air pressure for meeting the pneumatic demands may come at a significant fuel burn cost. Additionally, there is a trend to reduce or eliminate bleed-air systems in aircraft; for example Boeing's 787 has a no-bleed systems architecture which utilizes electrical systems to replace most of the pneumatic systems to improve fuel efficiency, as well as reduce weight and lifecycle costs. Other aircraft architectures may adopt low-pressure bleed configurations where engine design parameters allow for a bleed flow of compressed air, but at pressures less than the 45 psi air (unless stated otherwise, "psi" as used herein means absolute pressure in pounds per square inch, i.e., psia) that has been typically provided in the past to conventional onboard environmental control systems. A separate compressor or compressors can be used to provide pressurized air to the membrane gas separator, but this undesirably increases aircraft payload, and also represents another onboard device with moving parts that is subject to maintenance issues or device failure.

BRIEF DESCRIPTION

A fuel tank inerting system is disclosed. The inerting system includes a primary catalytic reactor comprising an inlet, an outlet, a reactive flow path between the inlet and the outlet, and a catalyst on the reactive flow path, said catalytic reactor arranged to receive fuel from the fuel tank and air from an air source that are mixed to form a combined flow, and to react the combined flow along the reactive flow path to generate an inert gas. The system includes a secondary catalytic reactor coupled in parallel with the primary catalytic reactor, the secondary catalytic reactor having an inlet and an outlet. The system also includes an input sensor that measures a property of the combined flow before it enters the secondary catalytic reactor; and an output sensor that measures the property of the combined flow after it exits the secondary catalytic reactor.

In one embodiment of any system described above, the system can further include a computing device that receives sensor data from the input and output sensors and determines catalyst activity in the secondary catalytic reactor based on the sensor data for use in making an aircraft operation decision.

In one embodiment of any system described above the aircraft operation decision is related to the maintenance of the primary catalytic reactor or a catalyst in the primary catalytic reactor.

In one embodiment of any system described above the computing device determines the quality of fuel used by the system based on the sensor data.

In one embodiment of any system described above the determination of fuel quality is made by comparison of the sensor data to predicted sensor data.

In one embodiment of any system described above the predicted sensor data is based on a mathematical model.

In one embodiment of any system described above the model is a model of catalytic activity for a catalyst in the secondary catalytic reactor versus time.

In one embodiment of any system described above the catalyst in the secondary catalytic reactor is the same as catalyst on the reactive flow path.

In one embodiment of any system described above the aircraft operation decision is a refueling fuel choice based on fuel quality In another embodiment, a fuel tank inerting system that includes a primary catalytic reactor comprising an inlet, an outlet, a reactive flow path between the inlet and the outlet, and a catalyst on the reactive flow path, said catalytic reactor arranged to receive fuel from the fuel tank and air from an air source that are mixed to form a combined flow, and to react the combined flow along the reactive flow path to generate an inert gas is disclosed. The system also includes an input sensor that measures a property of the combined flow before it enters the primary catalytic reactor and an output sensor that measures the property of the combined flow after it exits the primary catalytic reactor.

In one embodiment of any system described above the system further includes a computing device that receives sensor data from the input and output sensors wherein the computing device determines catalyst activity in the primary catalytic reactor based on the sensor data for use in making an aircraft operation decision.

In one embodiment of any system described above the aircraft operation decision is related to the maintenance of the primary catalytic reactor or the catalyst in the primary catalytic reactor.

In one embodiment of any system described above the computing device determines the quality of fuel used by the system based on the sensor data.

In one embodiment of any system described above the determination of fuel quality is made by comparison of the sensor data to predicted sensor data.

In one embodiment of any system described above the predicted sensor data is based on a mathematical model.

In one embodiment of any system described above the model is a model of catalytic activity for a catalyst in the primary catalytic reactor versus time.

In one embodiment of any system described above the aircraft operation decision is a refueling fuel choice based on fuel quality.

In one embodiment of any system described above the aircraft operation decision is related to the maintenance of the primary catalytic reactor.

One embodiment is directed to a method of measuring a catalyst in a fuel tank inerting system. The method includes: passing a flow of fuel through a primary catalytic reactor comprising an inlet, an outlet, a reactive flow path between the inlet and the outlet, and the catalyst on the reactive flow path, said catalytic reactor arranged to receive fuel from the fuel tank and air from an air source that are mixed to form a combined flow, and to react the combined flow along the reactive flow path to generate an inert gas; passing a portion of the flow through a secondary catalytic reactor coupled in parallel with the primary catalytic reactor and containing a second catalyst, the secondary catalytic reactor having an inlet and an outlet; measuring with an input sensor a property of the combined flow before it enters the secondary catalytic reactor; measuring with an output sensor that measures the property of the combined flow after it exits the secondary catalytic reactor; determining catalyst activity in the primary catalytic reactor based on the sensor data; and utilizing the determination to make an aircraft operation decision.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
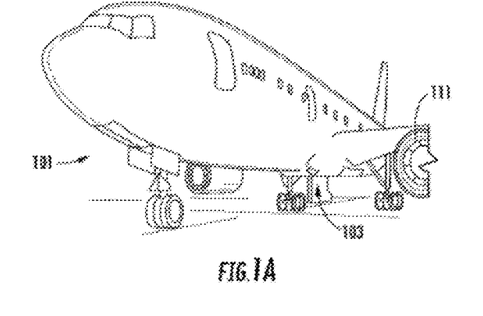
FIG. 1A is a schematic illustration of an aircraft that can incorporate various embodiments of the present disclosure.
Figure 1B:
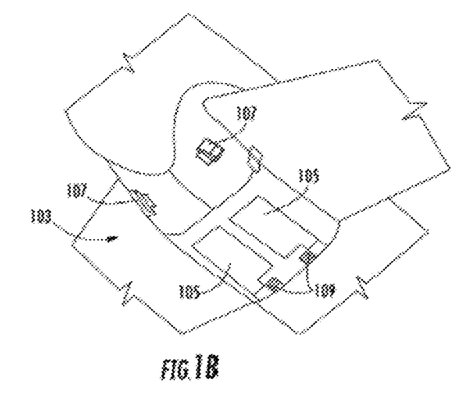
FIG. 1B is a schematic illustration of a bay section of the aircraft of FIG. 1A.

As shown in FIGS. 1A-1B, an aircraft 101 can include one or more bays 103 beneath a center wing box. The bay 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, fuel inerting systems, etc.). Some air may be exhausted through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve a desired air separation. Such systems require a high pressure pneumatic source to drive the separation process across the membrane. Further, the hollow fiber membrane separators commonly used are relatively large in size and weight, which is a significant consideration with respect to aircraft applications (e.g., reductions in volume and weight of components can improve flight efficiencies). Embodiments provided herein provide reduced volume and/or weight characteristics of inert-gas or low-oxygen supply systems for aircraft. Further, embodiments provided herein can prevent humid air from entering fuel tanks of the aircraft, thus preventing various problems that may arise with some fuel system components. In accordance with some embodiments of the present disclosure, the typical hollow fiber membrane separator is replaced by a catalytic system (e.g., $CO_2$ generation system), which can be, for example, smaller, lighter, and/or more efficient than the typical fiber membrane separators. That is, in accordance with embodiments of the present disclosure, the use of hollow fiber membrane separators may be eliminated.

A function of fuel tank flammability reduction systems in accordance with embodiments of the present disclosure is accomplished by reacting a small amount of fuel vapor (e.g., a "first reactant") with a source of gas containing oxygen (e.g., a "second reactant"). The product of the reaction is carbon dioxide and water vapor. The source of the second reactant (e.g., air) can be bleed air or any other source of air containing oxygen, including, but not limited to, high-pressure sources (e.g., engine), bleed air, cabin air, etc. A catalyst material is used to induce a chemical reaction, including, but not limited to, precious metal materials. The carbon dioxide that results from the reaction is an inert gas that is mixed with nitrogen naturally found in fresh/ambient air, and is directed back within a fuel tank to create an inert environment within the fuel tank, thus reducing a flammability of the vapors in the fuel tank. Further, in some embodiments, the fuel tank flammability reduction or inerting systems of the present disclosure can provide a functionality such that water vapor from the atmosphere does not enter the fuel tanks during descent stages of flight of an aircraft. This can be accomplished by controlling a flow rate of inert gas into the fuel tank so that a positive pressure is continuously maintained in the fuel tank.

In accordance with embodiments of the present disclosure, a catalyst is used to induce a chemical reaction between oxygen ($O_2$) and fuel vapor to produce carbon dioxide ($CO_2$) and water vapor. The source of $O_2$ used in the reaction can come from any of a number of sources, including, but not limited to, pneumatic sources on an aircraft that supply air at a pressure greater than ambient. The fuel vapor is created by draining a small amount of fuel from an aircraft fuel tank into an evaporator container or by injecting and atomizing fuel in a hot air stream. The fuel can be heated to vaporize the fuel, such as by using an electric heater, as shown and described in some embodiments of the present disclosure. The fuel vapor is removed from the evaporator container, in some embodiments, by an ejector which can induce a suction pressure that pulls the fuel vapor out of the evaporator container. Such ejectors can utilize elevated pressures of a second reactant source containing $O_2$ (e.g., a pneumatic source) to induce a secondary flow of the ejector which is sourced from the evaporator container. As such, the ejector can be used to mix the extracted fuel vapor with the $O_2$ from a second reactant source.

The mixed air stream (fuel vapor and oxygen or air) is then introduced to a catalyst, which induces a chemical reaction that transforms the $O_2$ and fuel vapor into $CO_2$ and water vapor. Any inert gas species that are present in the mixed stream (for example, nitrogen), will not react and will thus pass through the catalyst unchanged. In some embodiments, the catalyst is in a form factor that acts as a heat exchanger. For example, in one non-limiting configuration, a plate fin heat exchanger configuration is employed wherein a hot side of the heat exchanger would be coated with catalyst material. In such arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

As noted above, the catalytic chemical reaction generates water vapor. Having water (in any form) enter primary fuel tank can be undesirable. Thus, in accordance with embodiments of the present disclosure, the water from a product gas stream (e.g., exiting the catalyst) can be removed through various mechanisms, including, but not limited to, condensation. The product gas stream can be directed to enter a heat exchanger downstream from the catalyst that is used to cool the product gas stream such that the water vapor condenses and drops out of the product gas stream. The liquid water can then be drained overboard. In some embodiments, an optional water separator can be used to augment or provide water separation from the product stream.

In some embodiments, a flow control valve meters a flow of an inert gas (with water vapor removed therefrom) to a predetermined and/or controlled inert gas flow rate. Further, in some embodiments, an optional fan can be used to boost the inert gas stream pressure to overcome a pressure drop associated with ducting and flow lines between the catalyst and a fuel tank into which the inert gas is supplied. In some embodiments, a flame arrestor can be arranged at an inlet to the fuel tank (where the inert gas enters) to prevent any potential flames from propagating into the fuel tank.

Independent of any aircraft flammability reduction systems, aircraft fuel tanks are typically vented to ambient pressure. At altitude, pressure inside the fuel tank is very low and is roughly equal to ambient pressure. However, during descent, the pressure inside the fuel tank needs to rise to equal ambient pressure at sea level (or at whatever altitude the aircraft is landing). The change in pressures requires gas entering the tank from outside to equalize the pressure. When air from outside enters the tank, water vapor is normally present with it. Water can become trapped in the fuel tank and cause problems. In accordance with embodiments of the present disclosure, to prevent water from entering the fuel tanks, the fuel inerting systems of the present disclosure can re-pressurize the fuel tanks with dry inert gas that is generated as described above and below. The re-pressurization can be accomplished by using a flow control valve to control the flow of inert gas into the fuel tank such that a positive pressure is constantly maintained in the fuel tank. The positive pressure within the fuel tank can prevent air from entering the fuel tank from outside during descent and therefore prevent water from entering the fuel tank.

Figure 2:
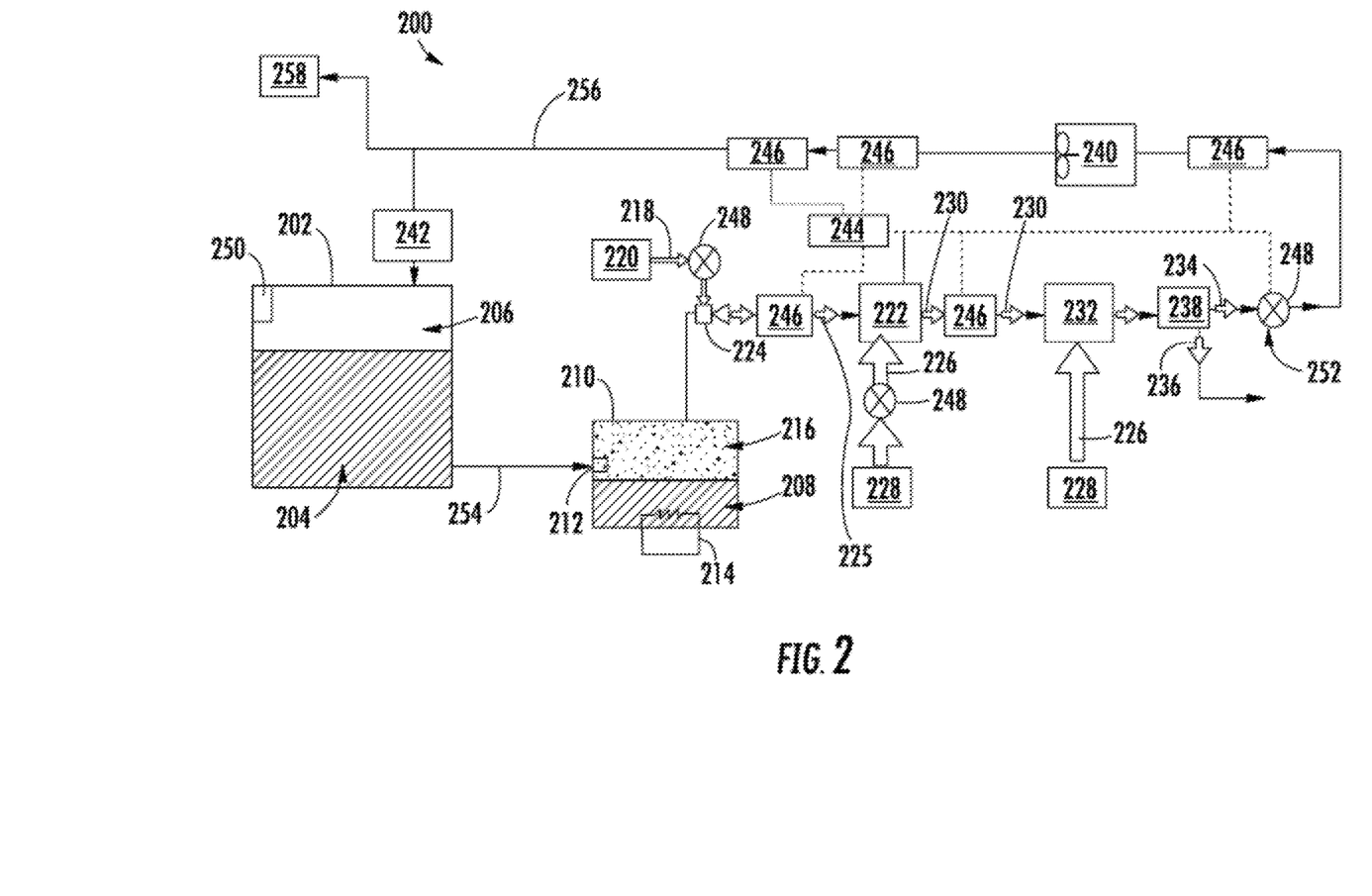
FIG. 2 is a schematic illustration of an example embodiment of a fuel tank inerting system.

FIG. 2 is a schematic illustration of a flammability reduction or inerting system 200 utilizing a catalytic reaction to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

In accordance with embodiments of the present disclosure, an inerting fuel 208 can be extracted from the fuel tank 202 and into an evaporator container 210. The amount of fuel 204 that is extracted into the evaporator container 210 (i.e., the amount of inerting fuel 208) can be controlled by an evaporator container valve 212, such as a float valve. The inerting fuel 208, which may be in liquid form when pulled from the fuel tank 202, can be vaporized within the evaporator container 210 using a heater 214, such as an electric heater, to generate a first reactant 216. The first reactant 216 is a vaporized portion of the inerting fuel 208 located within the evaporator container 210. The first reactant 216 is mixed with a second reactant 218 which is sourced from a second reactant source 220. The second reactant 218 is air containing oxygen that is catalyzed with the first reactant 216 to generate an inert gas to be supplied into the ullage space 206 of the fuel tank 202. The second reactant 218 can come from any source on an aircraft that is at a pressure greater than ambient, including, but not limited to bleed air from an engine, cabin air, high pressure air extracted or bled from an engine, etc. (i.e., any second reactant source 220 can take any number of configurations and/or arrangements). The first reactant 216 within the evaporator container 210 and the second reactant 218 can be directed into a catalytic reactor 222 by and/or through a mixer 224, which, in some embodiments, may be an ejector or jet pump. The mixer 224 will mix the first and second reactants 216, 218 into a mixed air stream 225.

The catalytic reactor 222 can be temperature controlled to ensure a desired chemical reaction efficiency such that an inert gas can be efficiently produced by the inerting system 200 from the mixed air stream 225. Accordingly, cooling air 226 can be provided to extract heat from the catalytic reactor 222 to achieve a desired thermal condition for the chemical reaction within the catalytic reactor 222. The cooling air 226 can be sourced from a cool air source 228. A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236. A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The byproduct 236 may be liquid water or water vapor, and thus in the present configuration shown in FIG. 2, a water separator 238 is provided downstream of the heat exchanger 232 to extract the liquid water or water vapor from the catalyzed mixture 230, thus leaving only the inert gas 234 to be provided to the ullage space 206 of the fuel tank 202.

The inerting system 200 can include additional components including, but not limited to, a fan 240, a flame arrestor 242, and a controller 244. Various other components can be included without departing from the scope of the present disclosure. Further, in some embodiments, certain of the included components may be optional and/or eliminated. For example, in some arrangements, the fan 240 and/or the water separator 238 can be omitted. The controller 244 can be in operable communication with one or more sensors 246 and valves 248 to enable control of the inerting system 200.

In one non-limiting example, flammability reduction is achieved by the inerting system 200 by utilizing the catalytic reactor 222 to induce a chemical reaction between oxygen (second reactant 218) and fuel vapor (first reactant 216) to produce carbon dioxide (inert gas 234) and water in the vapor phase (byproduct 236). The source of the second reactant 218 (e.g., oxygen) used in the reaction can come from any source on the aircraft that is at a pressure greater than ambient. The fuel vapor (first reactant 216) is created by draining a small amount of fuel 204 from the fuel tank 202 (e.g., a primary aircraft fuel tank) into the evaporator container 210. The inerting fuel 208 within the evaporator container 210 is heated using the electric heater 214. In some embodiments, the first reactant 216 (e.g., fuel vapor) is removed from the evaporator container 210 by using the mixer 224 to induce a suction pressure that pulls the first reactant 216 out of the evaporator container 210. The mixer 224, in such embodiments, utilizes the elevated pressure of the second reactant source 220 to induce a secondary flow within the mixer 224 which is sourced from the evaporator container 210. Further, as noted above, the mixer 224 is used to mix the two gas streams (first and second reactants 216, 218) together to form the mixed air stream 225.

The mixed air stream 225 (e.g., fuel vapor and oxygen or air) is then introduced to the catalytic reactor 222, inducing a chemical reaction that transforms the mixed air stream 225 (e.g., fuel and air) into the inert gas 234 and the byproduct 236 (e.g., carbon dioxide and water vapor). It is noted that any inert gas species that are present in the mixed air stream 225 (for example, nitrogen) will not react and will thus pass through the catalytic reactor 222 unchanged. In some embodiments, the catalytic reactor 222 is in a form factor that acts as a heat exchanger. For example, one non-limiting configuration may be a plate fin heat exchanger wherein the hot side of the heat exchanger would be coated with the catalyst material. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalyst heat exchanger can be controlled such that the temperature of the hot mixed gas stream 225 is hot enough to sustain the chemical reaction desired within the catalytic reactor 222, but cool enough to remove the heat generated by the exothermic reaction, thus maintaining aircraft safety and materials from exceeding maximum temperature limits.

As noted above, the chemical reaction process within the catalytic reactor 222 can produce byproducts, including water in vapor form. It may be undesirable to have water (in any form) enter the fuel tank 202. Accordingly, water byproduct 236 can be removed from the product gas stream (i.e., inert gas 234) through condensation. To achieve this, catalyzed mixture 230 enters the heat exchanger 232 that is used to cool the catalyzed mixture 230 such that the byproduct 236 can be removed (e.g., a majority of the water vapor condenses and drops out of the catalyzed mixture 230). The byproduct 236 (e.g., liquid water) can then be drained overboard. An optional water separator 238 can be used to accomplish this function.

A flow control valve 248 located downstream of the heat exchanger 232 and optional water separator 238 can meter the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient pressure. Thus, as shown in FIG. 2, the fuel tank 202 includes a vent 250. At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize the pressure. When air from outside enters the fuel tank 202, water vapor can be carried by the ambient air into the fuel tank 202. To prevent water/water vapor from entering the fuel tank 202, the inerting system 200 can re-pressurize the fuel tank 202 with the inert gas 234 generated by the inerting system 200. This is accomplished by using the valves 248. For example, one of the valves 248 may be a flow control valve 252 that is arranged fluidly downstream from the catalytic reactor 222. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

As noted above, the controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258, as schematically shown.

The monitoring systems disclosed herein can be used with the above described inerting system. However, such monitoring system is not limited to such systems and can be used in any inerting system utilizing a catalyst (catalytic systems).

Catalytic systems are subject to decay due to the presence of certain elements (e.g., sulfur) in the feed gas, including the fuel. Monitoring catalyst decay can be useful to determine when catalyst replacement is necessary, when catalyst regeneration should be performed, or when different feed sources with impurities have been introduced to the catalyst.

In one embodiment, sensors can be applied to measure catalyst activity (e.g, in catalytic reactor 222 of FIG. 2). These sensors can be temperature sensors in one embodiment. In one embodiment, gas composition sensors can be utilized in addition to or alternative to the temperature sensors that measure one or more of: oxygen, carbon dioxide and water composition of the gas entering and leaving a catalyst containing region (e.g., a catalytic reactor).

Figure 3:
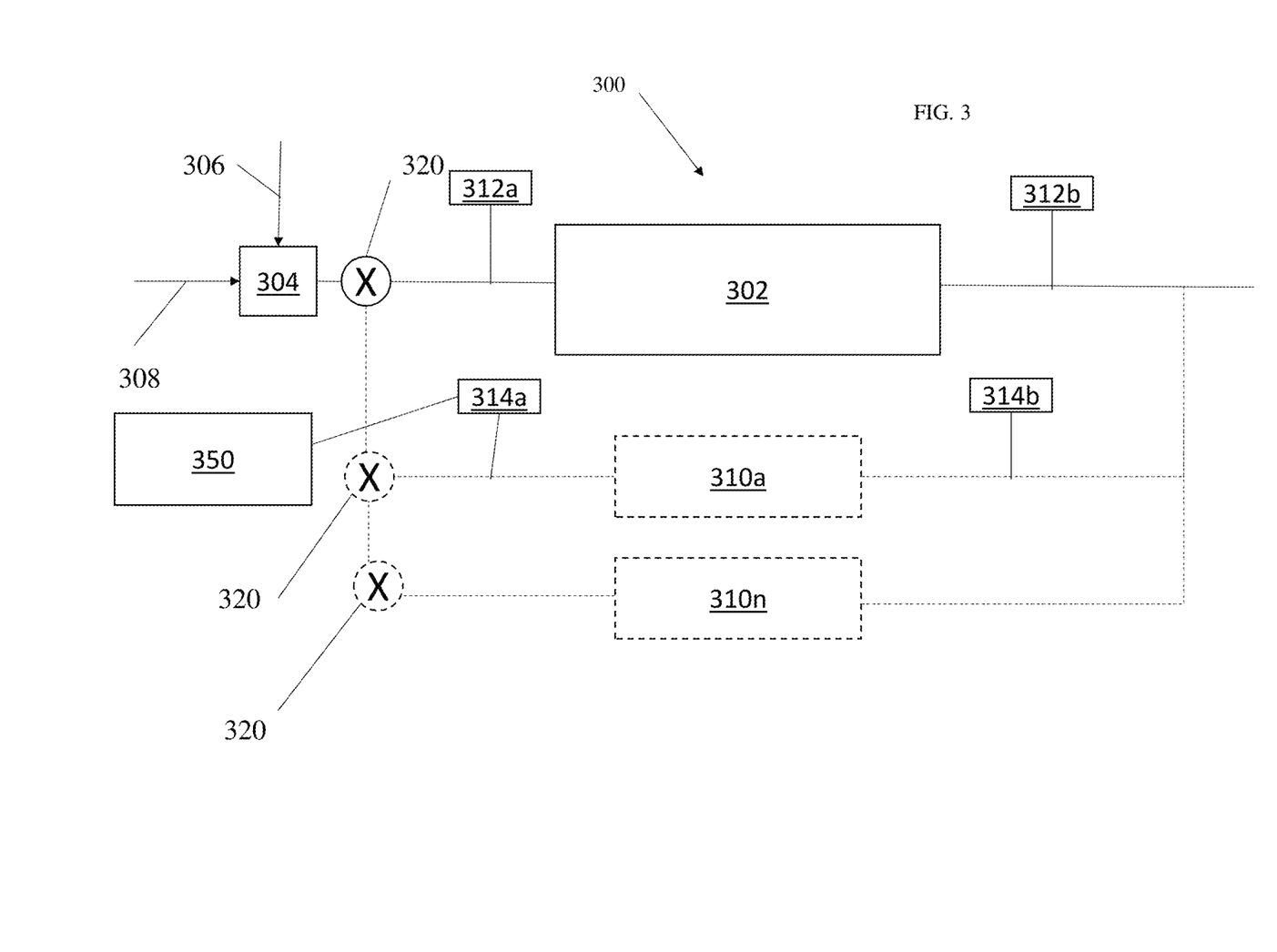
FIG. 3 is schematic of elements used to monitor catalyst decay according to one or more embodiments.

FIG. 3 shows a simplified version of a catalytic system 300 according to one embodiment. The system includes a primary catalytic reactor 302. The primary catalytic reactor 302 induces a chemical reaction between oxygen (second reactant 308) and fuel vapor (first reactant 306) to produce carbon dioxide and water in the vapor phase. The source of the second reactant 308 (e.g., oxygen) used in the reaction can come from any source on the aircraft that is at a pressure greater than ambient. The fuel vapor (first reactant 306) is received either directly or indirectly from the aircraft fuel tank (e.g., fuel tank 202 in FIG. 2). The first and second reactants 306, 308, can be mixed in a mixing chamber 304 before being provided to the primary catalytic reactor 302.

The system 300 can include one or more primary catalytic reactor sensors 312. As shown, the system 200 includes two primary catalytic reactor sensors 312a, 312b. This is not meant to be limiting and other numbers of sensors could be provided. The sensors 312 can be temperature sensors and/or gas composition sensors. By comparing the readings of the sensors, a status of the catalyst in the reactor 302 can be determined. Such a status can be used for scheduling maintenance and/or scheduling catalyst regeneration timing. In one embodiment, the status can be used to help determine quality of fuel being used in the reactor.

An example is illustrative. Based on either prior or modelled sensor readings from the two primary catalytic reactor sensors 312a and 312b, a catalyst decay model can be created for the primary catalytic reactor 302. For example, as the catalyst decays, the conversion of oxygen to $CO_2$ may decline overtime. Thus, if the primary catalytic reactor sensors 312a and 312b are measuring $O_2$ at the input and output of the primary catalytic reactor 302, the amount of $O_2$ at the output will rise over time as the effectiveness of the catalyst declines.

Figure 4:
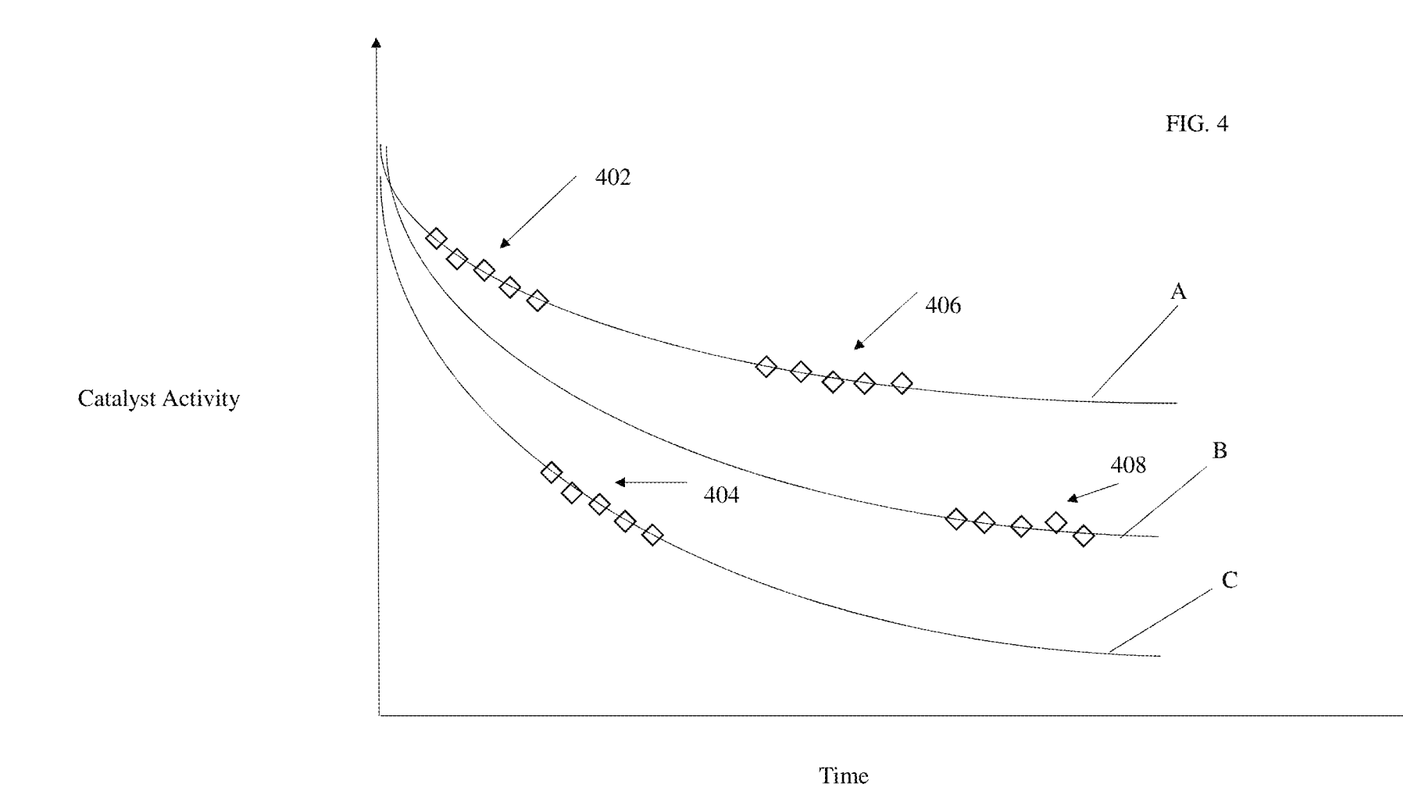
FIG. 4 is graph showing comparisons of modeled versus actual catalyst decay.

FIG. 4 shows a graph of catalytic activity over time. As time increases, the activity of the catalyst will decrease. This decrease can present itself as the ratio of output to input $CO_2$, for example. In another embodiment, such a decrease can present itself as an increase in the ratio of the input to output temperature of primary catalytic reactor 302. For purposes of explanation, in FIG. 4, trace A is the "expected" or "model" catalytic activity decay based on normal operation.

The first sensor 312a measures a property of the stream entering the primary catalytic chamber 302 and the second sensor 312b measures a property of stream exiting the primary catalytic chamber 302. The stream 312a is combined stream of fuel and air.

In one embodiment the sensors 312a and 312b are temperature sensors. In another, the sensors 312as and 312b are gas composition sensors that can measure one or more of: oxygen, carbon dioxide and water composition of the gas entering and leaving the catalyst reactor 302.

Further to the above, assumed trace A is a model that reflects catalyst decay during normal operation. Catalyst decay data collected during first flight (group 402) may closely lie on that trace and data collected during a second flight (group 404) may lie on another model (e.g., trace C) for decay in the presence of high sulfur levels.

Then, on a third flight decay data (group 406) the fuel source was changed back to that of flight A and on a fourth flight (group 408) the collected data can lie on yet another model (trace B) for decay in the presence of higher sulfur levels; followed by a fourth flight's decay data (group 408) where yet a third fuel source was used.

By comparing group 402 and 406 to group 404 and group 408 to trace B it can be determined that the fuel provided during second flight containing high levels of sulfur compared to the normal fuel during the first and third flights. This can indicate that the fuel used in groups 402 and 406 may be a sulfur-free biofuel and subject to a tax credit. In addition, the lower sulfur containing jet fuel of flight 4 (group 408) could be provided at a different airport. This information can be used to determine that continued operation with the fuel from the second flight will result in loss of catalyst activity and the need to replace or regenerate the catalyst within hundreds of hours versus a planned life of greater than 10,000 hours, for example. In addition, knowing that certain airports provide fuel with more sulfur may affect fuel buying decisions for a carrier based on route and airports on the route. While sulfur has been used in the above example it shall be understood that the model can be used to generally show decay due to any poison or other element that increases decay.

From the above, it will be apparent to the skilled artisan that monitoring the input and output of a catalyst reactor can be used to make many types of aircraft operation decisions that affect aircraft operation. The decisions include but are not limited to: maintenance decisions, flight routing decisions, and fueling decisions to name but a few. Having such information can have the technical effect of allowing for better planning based on actual flight conditions rather than just on a predetermined schedule. The monitoring can also be used to determine differences in jet fuel used on a given flight based on decay. For example, decay of the catalyst can be used to tell the difference between lower sulfur fuels versus higher sulfur fuels or synthetic versus biofuels. Knowing the type of fuel used can have not only maintenance implications but can also provide information as to when environmentally friendly fuels have been used on the flight which can be used for future flight planning or tax credit applications.

In the above description, the primary catalytic reactor sensors 312a, 312b were used to monitor the reactor 302. In one embodiment, one or more secondary catalytic reactors 310a through 310n are provided in parallel with the primary reactor 302. Each can be fed a bypass stream via one or more valves 320. This bypass stream has the same characteristics as the combined flow of air/fuel exiting the mixing chamber 304 that is provided to the primary catalyst reactor 302.

Each secondary reactor can include one or more secondary catalytic reactor sensors 314a, 314b. This is not meant to be limiting and other numbers of sensors could be provided. The sensors 314 can be temperature sensors and/or gas composition sensors. By comparing the readings of the sensors, a status of the catalyst in the secondary reactors (e.g., 310a through 310n) can be determined. Such a status can be used for any of the reasons described above.

In one embodiment, a first secondary reactor 310a includes the same catalyst as the primary reactor 302. The secondary reactor can be smaller and can have its own models applied but the same models could be for both. The smaller size can be helpful in more accurately measuring decay rate. In the above, the secondary catalyst reactor 310 has separate sensors from the primary reactor 302. However, the skilled artisan will realize that all that may be needed is one sensor that measure air going into the secondary reactor 310 as well as 302, regardless of where those sensors are located.

Provided in one embodiment is a computing device 350 that receives information from one or more of the sensors in FIG. 3. Based on the sensor readings, aircraft operation decisions as described above can be made. The decisions can be made by the computing device automatically in one embodiment. In another, the computing device receives the sensor data (or information about the sensor data) and presents it to a human to make aircraft operation decisions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring a catalyst in a fuel tank inerting system, the method comprising:
    passing a flow of fuel through a primary catalytic reactor comprising an inlet, an outlet, a reactive flow path between the inlet and the outlet, and the catalyst on the reactive flow path, said primary catalytic reactor arranged to receive fuel from a fuel tank and air from an air source that are mixed to form a combined flow, and to react the combined flow along the reactive flow path to generate an inert gas;
    passing a portion of the combined flow through a secondary catalytic reactor coupled in parallel with the primary catalytic reactor and containing a second catalyst, the secondary catalytic reactor having an inlet and an outlet;
    measuring with an input sensor a property of the combined flow before it enters the secondary catalytic reactor;
    measuring with an output sensor the property of the combined flow after it exits the secondary catalytic reactor;
    providing sensor data from the input and output sensors to a computing device that receives the sensor data; and
    determining with the computing device a fuel quality of the fuel used by the fuel tank inerting system based on the sensor data.

2. The method of claim 1, further comprising determining with the computing device based on the sensor data a catalyst activity of the second catalyst in the secondary catalytic reactor for use in making an aircraft operation decision.

3. The method of claim 2, wherein the aircraft operation decision is related to the maintenance of the primary catalytic reactor or the catalyst in the primary catalytic reactor.

4. The method of claim 3, wherein the determining the fuel quality includes comparing of the sensor data to predicted sensor data.

5. The method of claim 4, wherein the predicted sensor data is based on a mathematical model.

6. The method of claim 5, wherein the mathematical model is a model of catalytic activity for the second catalyst in the secondary catalytic reactor versus time.

7. The method of claim 6, wherein the second catalyst in the secondary catalytic reactor is the same as the catalyst on the reactive flow path.

8. The method of claim 2, wherein the aircraft operation decision is a refueling fuel choice based on the fuel quality.

9. The method of claim 2, wherein the aircraft operation decision is a flight routing decision based on the fuel quality.

* * * * *